United States Patent
Shin et al.

(10) Patent No.: US 12,412,959 B2
(45) Date of Patent: Sep. 9, 2025

(54) SEPARATOR FOR ELECTROCHEMICAL DEVICE AND ELECTROCHEMICAL DEVICE INCLUDING THE SAME

(71) Applicant: LG ENERGY SOLUTION, LTD., Seoul (KR)

(72) Inventors: Jin Young Shin, Daejeon (KR); So Mi Jeong, Daejeon (KR); Ji Hyun Bang, Daejeon (KR); Won Sik Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/597,783

(22) Filed: Mar. 6, 2024

(65) Prior Publication Data
US 2024/0372218 A1 Nov. 7, 2024

(30) Foreign Application Priority Data
May 3, 2023 (KR) .................. 10-2023-0058002

(51) Int. Cl.
*H01M 50/457* (2021.01)
*H01M 4/02* (2006.01)
(Continued)

(52) U.S. Cl.
CPC ......... *H01M 50/457* (2021.01); *H01M 4/134* (2013.01); *H01M 10/0566* (2013.01);
(Continued)

(58) Field of Classification Search
CPC ............... H01M 50/457; H01M 4/134; H01M 10/0566; H01M 50/42; H01M 50/443;
(Continued)

(56) References Cited

U.S. PATENT DOCUMENTS

2009/0246628 A1* 10/2009 Adachi .................. H01M 4/13
429/209
2019/0097199 A1 3/2019 Yamamoto et al.
(Continued)

FOREIGN PATENT DOCUMENTS

CN 112563453 A 3/2021
CN 114284642 B2 4/2022
(Continued)

OTHER PUBLICATIONS

Vandenburg et al., "A simple solvent selection method for accelerated solvent extraction of additives from polymers", Sep. 1999, Analyst, 124, 1707-1710 (Year: 1999).*

(Continued)

*Primary Examiner* — Daniel S Gatewood
(74) *Attorney, Agent, or Firm* — Bryan Cave Leighton Paisner LLP

(57) ABSTRACT

A separator for an electrochemical device includes a porous polymer substrate; a first coating layer provided on at least one surface of the porous polymer substrate and containing a first polymer resin of a first solubility in an electrolyte; and a second coating layer provided on the first coating layer and including a second polymer resin of a second solubility in the electrolyte, and inorganic particles, wherein the first solubility is higher than the second solubility in the electrolyte, and the separator is provided on a negative electrode containing a silicon (Si).

13 Claims, 1 Drawing Sheet

(51) Int. Cl.
*H01M 4/134* (2010.01)
*H01M 10/0566* (2010.01)
*H01M 50/42* (2021.01)
*H01M 50/443* (2021.01)
*H01M 50/491* (2021.01)

(52) U.S. Cl.
CPC ......... *H01M 50/42* (2021.01); *H01M 50/443* (2021.01); *H01M 50/491* (2021.01); *H01M 2004/021* (2013.01); *H01M 2004/027* (2013.01); *H01M 2300/0051* (2013.01)

(58) Field of Classification Search
CPC ......... H01M 50/491; H01M 2004/021; H01M 2004/027; H01M 2300/0051
See application file for complete search history.

(56) References Cited

U.S. PATENT DOCUMENTS

2019/0319239 A1* 10/2019 Zhou .................. H01M 50/46
2024/0021833 A1* 1/2024 He ...................... H01M 4/62

FOREIGN PATENT DOCUMENTS

| | | | |
|---|---|---|---|
| JP | WO 2017-073585 | A1 | 5/2017 |
| JP | 6566130 | B2 | 8/2019 |
| KR | 10-0656085 | B1 | 12/2006 |
| KR | 10-1040482 | B1 | 6/2011 |
| KR | 10-2011-0097715 | A | 8/2011 |
| KR | 10-1054976 | B1 | 8/2011 |
| KR | 10-1060400 | B1 | 8/2011 |
| KR | 10-1254693 | B1 | 4/2013 |
| KR | 10-1745631 | B1 | 6/2017 |
| KR | 10-1809120 | B1 | 1/2018 |
| KR | 10-2019-0084894 | A | 7/2019 |
| KR | 10-2020-0078416 | A | 7/2020 |
| KR | 10-2021-0060238 | A | 5/2021 |
| KR | 10-2021-0149491 | A | 12/2021 |
| KR | 20210149491 | A * | 12/2021 |
| KR | 10-2022-0009917 | A | 1/2022 |
| KR | 10-2366306 | B1 | 2/2022 |
| KR | 10-2366785 | B1 | 2/2022 |
| KR | 10-2022-0030908 | A | 3/2022 |
| KR | 10-2385925 | B1 | 4/2022 |
| KR | 10-2407049 | B1 | 6/2022 |
| KR | 10-2414357 | B1 | 6/2022 |
| KR | 10-2022-0152080 | A | 11/2022 |
| WO | WO-2023029889 | A1 * | 3/2023 ........ H01M 10/0525 |

OTHER PUBLICATIONS

Bottino et al., "Solubility Parameters of Poly( vinylidene fluoride)", 1988, J.of Polymer Sci: B Polymer Physics, 26, 1-10 (Year: 1988).*

* cited by examiner

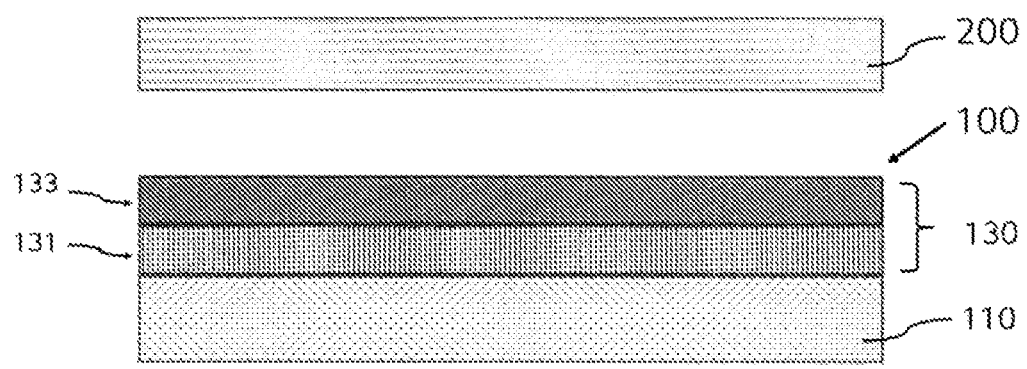

SEPARATOR FOR ELECTROCHEMICAL DEVICE AND ELECTROCHEMICAL DEVICE INCLUDING THE SAME

CROSS-REFERENCE TO RELATED APPLICATIONS

This application is based on and claims priority from Korean Patent Application No. 10-2023-0058002, filed on May 3, 2023 with the Korean Intellectual Property Office, the disclosure of which is incorporated herein in its entirety by reference.

TECHNICAL FIELD

The present disclosure relates to a separator for an electrochemical device and an electrochemical device containing the same.

BACKGROUND

Secondary batteries, such as lithium secondary batteries are gradually expanding their applications to, for example, electric vehicles. The secondary batteries generally generate electricity through a chemical reaction of lithium ions moving between a positive electrode material and a negative electrode material. While the overall capacity and voltage of the battery are determined according to the positive electrode material, the negative electrode material serves to store and release lithium ions coming from the positive electrode.

Meanwhile, while the material for the positive electrode and negative electrode represent the performance of a battery, the material for the separator may be said to be a key material related to the safety of the battery. Briefly, a separator is a thin membrane made of an insulating material and serves to separate the positive electrode and the negative electrode inside a battery so that the positive and negative electrodes do not come into contact with each other. In addition, the separator has very fine pores that are invisible to the human eyes, and lithium ions move between the positive electrode and negative electrode through the pores of the separator. In addition, when the temperature inside the battery rises above a predetermined level, the separator also serves to prevent an internal electric shortage by shutting down the pores located in the surfaces of the separator thereby blocking the movement of lithium ions.

For this reason, film substrates based on polymer resins having multiple pores are widely used as separators for electrochemical devices. Typically, electrode assemblies are manufactured through a lamination process in which a separator and an electrode are bonded by heat and pressure. As the heat and pressure applied in this process increase, the binding force between the electrode and the separator increases.

SUMMARY

The present disclosure provides a separator for an electrochemical device, which is provided on a negative electrode containing a silicon (Si)-based active material, in which solubilities of a first polymer resin of a first coating layer and a second polymer resin of a second coating layer included in a coating layer in an electrolyte are adjusted to inhibit the shut-down of pores in a porous polymer substrate, and an electrochemical device including the separator.

An embodiment of the present disclosure provides a separator for an electrochemical device which is provided on a negative electrode containing a silicon (Si)-based active material. The separator includes: a porous polymer substrate; a first coating layer provided on at least one surface of the porous polymer substrate and containing a first polymer resin; and a second coating layer provided on the first coating layer and including a second polymer resin and inorganic particles. The solubility of the first polymer resin in the electrolyte is higher than the solubility of the second polymer resin in the electrolyte.

According to an embodiment of the present disclosure, the first polymer resin may have a solubility parameter of about 17 $MPa^{1/2}$ or more and about 27 $MPa^{1/2}$ or less.

According to an embodiment of the present disclosure, the second polymer resin may have a solubility parameter less than about 17 $MPa^{1/2}$ or greater than about 27 $MPa^{1/2}$.

According to an embodiment of the present disclosure, the first polymer resin may include one selected from the group consisting of polystyrene, polyethyl acrylate, polymethyl acrylate, polystyrene sulfide, polyethylene terephthalate, polyvinyl chloride (PVC), polyvinyl pyrrolidone (PVP), polyvinyl acetate (PVAc), polyacrylonitrile (PAN), polylactic acid (PLA), polyacrylic acid (PAA), and a combination thereof.

According to an embodiment of the present disclosure, the second polymer resin may include one selected from the group consisting of PVDF-HFP copolymer, PVDF-CTFE copolymer, PVDF-HFP-CTFE terpolymer, cyanoethyl polyvinyl alcohol, and a combination thereof.

According to an embodiment of the present disclosure, the separator may have multiple pores, the porous polymer substrate may have a polydispersity index (PDI) of about 2.5 or more and about 10 or less, and the porous polymer substrate may have an average pore size of about 20 nm or more and about 80 nm or less.

According to an embodiment of the present disclosure, the negative electrode may contain the silicon (Si)-based active material about 50% by weight or more.

According to an embodiment of the present disclosure, the negative electrode may have a hardness of about 50 MPa or more and about 350 MPa or less.

An embodiment of the present disclosure provides an electrochemical device including a positive electrode, a negative electrode, an electrolyte, and a separator interposed between the positive electrode and the negative electrode.

According to an embodiment of the present disclosure, the first polymer resin may have a solubility parameter of about 17 $MPa^{1/2}$ or more and about 27 $MPa^{1/2}$ or less.

According to an embodiment of the present disclosure, the electrolyte may include one selected from the group consisting of propylene carbonate (PC), dimethyl carbonate (DMC), diethyl carbonate (DEC), fluoro-ethylene carbonate (FEC), and a combination thereof.

According to an embodiment of the present disclosure, one obtained by mixing the diethyl carbonate (DEC) and the fluoro-ethylene carbonate (FEC) may be used as the electrolyte.

According to an embodiment of the present disclosure, the electrolyte may contain the diethyl carbonate (DEC) and the fluoroethylene carbonate (FEC) in a ratio of about 10:90 to 99:1.

Another embodiment of the present disclosure provides a method of manufacturing a separator for an electrochemical device which is provided on a negative electrode containing a silicon (Si)-based active material. The method includes coating a porous polymer substrate with a first polymer resin and a second polymer resin having different solubilities in an electrolyte.

The solubility of the first polymer resin in an electrolyte may be higher than the solubility of the second polymer resin in the electrolyte.

The separator may include: a porous polymer substrate; a first coating layer provided on at least one surface of the porous polymer substrate and containing the first polymer resin; and a second coating layer provided on the first coating layer and containing a second polymer resin and inorganic particles.

A material having a solubility parameter of about 17 $MPa^{1/2}$ or more and about 27 $MPa^{1/2}$ or less may be selected as the first polymer material.

The first polymer resin may be selected from the group consisting of polystyrene, polyethyl acrylate, polymethyl acrylate, polystyrene sulfide, polyethylene terephthalate, polyvinyl chloride (PVC), polyvinyl pyrrolidone (PVP), polyvinyl acetate (PVAc), polyacrylonitrile (PAN), polylactic acid (PLA), polyacrylic acid (PAA), and a combination thereof.

The second polymer resin may be selected from the group consisting of PVDF-HFP copolymer, PVDF-CTFE copolymer, PVDF-HFP-CTFE terpolymer, cyanoethyl polyvinyl alcohol, and a combination thereof.

In the separator for an electrochemical device according to an embodiment of the present disclosure, the electrolyte solubilities of the first polymer resin of the first coating layer and the second polymer resin of the second coating layer included in the coating layer are adjusted so that the pores in the porous polymer substrate can be prevented from being deformed even when a negative electrode containing a silicon (Si)-based active material is applied.

In an electrochemical device according to an embodiment of the present disclosure, the second coating layer containing the second polymer resin and inorganic particles are provided on the first coating layer containing the first polymer so that even when a negative electrode containing a silicon (Si)-based active material is applied, the pores in the porous polymer substrate are prevented from being deformed, and compression resistance and heat resistance are both improved.

BRIEF DESCRIPTION OF THE DRAWINGS

FIG. 1 is a schematic view illustrating a separator and a negative electrode for an electrochemical device according to an embodiment of the present disclosure.

Corresponding reference characters indicate corresponding components throughout the several views of the drawings. The drawing FIGURES presented are illustrated for simplicity and clarity and have not necessarily been drawn to scale. For example, the dimensions of some of the elements in the FIGURES may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

When it is described herein that a part "includes" a certain component, this means that other components may be further included rather than being excluded unless specifically stated otherwise.

As used herein, "A and/or B" means "A and B, or A or B."

When it is described herein that a component is provided "on" one component, this means that other components may be further disposed therebetween rather than excluding that other components are disposed therebetween unless specifically stated to the contrary.

In this description, the characteristic "having pores" means that an object contains a plurality of pores and allows gaseous and/or liquid fluid to pass from one surface to the other surface of the object due to a structure in which the pores are connected to each other.

As used herein, terms "about," "approximately," and "substantially" are used to mean a range of numerical values or degrees, or approximations thereof, considering inherent manufacturing and material tolerances, and are used to prevent an infringer from unfairly exploiting the described content where precise or absolute values are mentioned to aid understanding of the present disclosure.

In the case of lithium secondary batteries, graphite is widely used as a negative electrode material, but the range of use of silicon (Si)-based negative electrode materials is expanding to improve the energy density of lithium secondary batteries. For example, a silicon negative electrode material has an energy density about 10 times higher than a graphite positive electrode material. Therefore, there are advantages in improving battery performance, such as increasing battery capacity and shortening charging speed, when the silicon positive electrode material is applied.

Meanwhile, in a secondary battery manufacturing process, a separator and an electrode may undergo a lamination process in which relatively high temperature and pressure are applied. In this case, when a silicon negative electrode material is applied, since its hardness is higher than that of a general graphite-based negative electrode material, there is a possibility that the pores in the separator will be deformed when the silicon negative electrode material and the separator come into contact with each other by the lamination process. Accordingly, when applying a silicon negative electrode material with high hardness to an electrode assembly, it is necessary for the separator to ensure compression resistance, insulating nature, and heat resistance that prevent the pores in the separator from being deformed due to the high pressure and heat in the lamination process even when the separator comes into contact with the silicon negative electrode material.

For example, as the process speed has recently increased for the purpose of improving productivity, the time for which heat is applied to the separator has shortened, and thus adhesion has been ensured by increasing pressure. However, in this process, there is concern about deformation of the separator due to high pressure. In addition, during the lamination process, the thickness of the polymer film substrate is significantly reduced, and along with this, the pores in the separator may be significantly damaged. As a result, there are problems such as a reduction in the dielectric breakdown voltage of the separator and a decrease in the performance of the battery.

In particular, when a silicon-based negative electrode active material such as Si, SiO, or a Si alloy is applied as a negative electrode active material for a lithium secondary battery, the compressive deformation of the separator due to an increase in the internal pressure of the cell during charging/discharging becomes more severe because the volume expansion of the negative electrode is large. In addition, the silicon-based negative electrode active material has a greater particle size, roughness, and hardness than the graphite negative electrode active material, and may cause local damage to the separator when laminated with the separator. Accordingly, the present disclosure provides a separator with improved compression resistance, insulating nature, and heat resistance that prevent pores from being deformed when applying the silicon-based negative electrode active material.

In this description, the separator has a porous property including multiple pores and serves as a porous ion-conducting barrier that blocks electrical contact between the negative electrode and the positive electrode in an electrochemical device while allowing ions to pass therethrough.

Hereinafter, the present disclosure will be described in more detail with reference to FIG. 1.

An embodiment of the present disclosure provides a separator 100 for an electrochemical device which is provided on a negative electrode 200 containing a silicon (Si)-based active material. The separator 100 includes: a porous polymer substrate 110; a first coating layer 131 provided on at least one surface of the porous polymer substrate 110 and containing a first polymer resin; and a second coating layer 133 provided on the first coating layer 131 and containing a second polymer resin and inorganic particles. The solubility of the first polymer resin contained in the first coating layer 131 in an electrolyte is higher than the solubility of the second polymer resin contained in the second coating layer 133 in the electrolyte.

In a separator for an electrochemical device according to an embodiment of the present disclosure, even when the negative electrode containing a silicon (Si)-based active material is applied, it is possible to prevent the pores in the porous polymer substrate from being deformed by adjusting the electrolyte solubilities of the first polymer resin of the first coating layer and the second polymer resin of the second coating layer included in the coating layer.

FIG. 1 is a schematic view of a separator and a negative electrode for an electrochemical device according to an embodiment of the present disclosure. With reference to FIG. 1, a negative electrode and a separator for an electrochemical device according to an embodiment of the present disclosure will be described.

According to an embodiment of the present disclosure, the silicon (Si)-based negative electrode active material essentially includes a Si-based compound. The Si-based component is used as a high-capacity negative electrode material since the Si-based compound reversibly occludes and releases lithium through a compound formation reaction with lithium and has a theoretical maximum capacity of about 4200 mAh/g (9366 mAh/cc with a specific gravity of 2.23), which is much greater than a carbon-based material.

According to an embodiment of the present disclosure, the Si-based compound may be one selected from the group consisting of a Si/C composite, $SiO_2$, $SiO_x$ ($0<x<2$), a metal-doped $SiO_x$ ($0<x<2$), pure Si, a silicon (Si) nanostructure, and a Si-alloy, and may be specifically a silicon-based oxide of $SiO_x$ ($0<x<2$), or a mixture of two or more of the listed materials. For example, x may be in the range of $0.1 \leq x \leq 1.2$, or, x may be 1.

The Si/C composite is subjected to a firing process, for example, in a state in which carbon is bonded to silicon or silicon oxide particles to have a configuration in which a carbon material is coated on the surfaces of particles or a configuration in which carbon is dispersed inside silicon particles in an atom state, and any configuration is possible without limitation as long as carbon and silicon materials form a composite.

In addition, the metal-doped $SiO_x$ ($0<x<2$) may have a configuration of being doped with one or more metals selected from the group consisting of Li, Mg, Al, Ca, and Ti.

When $SiO_x$ is doped as described above, the irreversible $SiO_2$ phase of the $SiO_x$ material is reduced or converted into an electrochemically inactive metal-silicate phase, which is more desirable since the initial efficiency of the $SiO_x$ material can be improved.

The Si-alloy is obtained by alloying Si with one or more metals selected from the group consisting of Zn, Al, Mn, Ti, Fe, and Sn, and may include, but is not limited to, for example, solid solutions, intermetallic compounds, and eutectic alloys with these metals.

In addition to the silicon (Si)-based negative electrode active material, the negative electrode may further include other negative electrode active materials such as graphite.

Research and development is continuing for the above-mentioned silicon (Si)-based negative electrode active material in consideration of, for example, capacity, and when the silicon (Si)-based negative electrode actives is applied as a negative active material of a lithium secondary battery, there is a problem in that the compressive deformation of the separator becomes more severe due to an increase in internal pressure in the cell during charging/discharging because the volume expansion of the negative electrode is great. In addition, the Si-based negative active material has a greater particle size, roughness, and hardness than a graphite negative electrode active material, and may cause local damage to a separator when laminated with the separator. Accordingly, it is intended to apply a separator capable of ensuring both heat resistance and compression resistance that prevent the pores in the separator from being deformed.

According to an embodiment of the present disclosure, the porous polymer substrate 110 of the separator may be manufactured using polymers known to be used as porous polymer substrates for lithium secondary batteries, such as polyolefin, polyethylene terephthalate, polybutylene terephthalate, polyacetal, polyamide, polycarbonate, polyimide, polyether ether ketone, polyethersulfone, polyphenylene oxide, polyphenylene sulfide, and polyethylene naphthalene. In particular, the porous polymer substrate 110 may be manufactured using polyolefin as a base polymer. Examples of polyolefins include one or more of polyethylene polypropylene, or polypentene.

A porous polymer substrate, e.g., a polymer substrate with multiple pores manufactured using the polyolefins as a base, is advantageous in terms of providing a shut-down function at an appropriate temperature. In particular, when polyethylene and polypropylene are both included as the polyolefins, physical properties such as a shut-down property and a mechanical strength can be both improved.

According to an embodiment of the present disclosure, the thickness of the porous polymer substrate may be about 1 μm to 100 μm. For example, the thickness of the porous polymer substrate may be about 10 μm or more and 95 μm or less, 15 μm or more and 90 μm or less, 20 μm or more and 85 μm, 25 μm or more and 80 μm or less, 30 μm or more and 75 μm or less, 35 μm or more and 70 μm or less, 40 μm or more and 65 μm or less, 45 μm or more and 60 μm or less, 50 μm or more and 65 μm or less, or 55 μm or more and 60 μm or less. The thickness may be, for example, about 1 μm to 30 μm, or about 5 μm to 30 μm. By adjusting the thickness of the porous polymer substrate within the above-mentioned ranges, the volume of the electrochemical device may be minimized, and the positive electrode and negative electrode may be electrically insulated.

According to an embodiment of the present disclosure, a porous polyolefin polymer substrate most commonly used as the porous polymer substrate may be manufactured as follows, but is not limited thereto.

The porous polyolefin polymer substrate is manufactured by a method including melting and extruding a polyolefin polymer to form the polymer into a sheet shape, and then stretching the sheet-shaped polymer to cause micro cracks to form micro voids between lamellas which are the crystal portions of the polymer (a dry method). In addition, the separator may be manufactured by a method in which a polyolefin polymer is kneaded with a diluent at a high temperature to create a single phase, then the polymer material and the diluent are phase-separated during a cooling process, then the diluent is extracted to form pores, and then the polymer material is stretched and subjected to heat setting (a wet method).

According to an embodiment of the present disclosure, the separator for an electrochemical device includes a coating layer 130 provided on at least one surface of the porous polymer substrate. For example, the separator for an electrochemical device includes a coating layer provided on one or both surfaces of the porous polymer substrate. As described above, by including a coating layer provided on at least one surface of the porous polymer substrate, the heat resistance and mechanical property of the separator for an electrochemical device can be improved, and since the separator shrinks at a high temperature, the occurrence of the electric shortage of the electrodes can be prevented.

According to an embodiment of the present disclosure, the separator includes a first coating layer 131 containing a first polymer resin. For example, the first coating layer may be located on the porous polymer substrate. Accordingly, when the first coating layer is coated on the porous polymer substrate, the first polymer resin is located inside the pores in the porous polymer substrate so that the pores may be closed. As a result, even when the lamination process is performed by applying a negative electrode containing a Si-based negative electrode active material with a relatively high hardness, the deformation phenomenon in which the pores become smaller or shut down is inhibited or avoided due to the first polymer resin located inside the pores. Since the separator includes the first coating layer containing the first polymer resin as described above, a separator for an electrochemical device with improved compression resistance and heat resistance can be implemented even when the Si-based negative electrode active material is applied.

According to an embodiment of the present disclosure, the separator includes a second coating layer 133 provided on the first coating layer and containing a second polymer resin and inorganic particles. For example, the second coating layer may be located on the first coating layer located on the porous polymer substrate. When the first polymer resin contained in the first coating layer is located in the pores of the porous polymer substrate and all or part of the first coating layer does not remain, the second coating layer may be located in contact with the porous polymer substrate. Since the separator includes the second coating layer provided on the first coating layer and containing the second polymer resin and the inorganic particles as described above, the separator can be improved in heat resistance and mechanical property, and since the separator shrinks at high temperature, the occurrence of the electric shortage of the electrodes can be prevented, and pores can be formed inside the coating layer.

According to an embodiment of the present disclosure, each of the first polymer resin and the second polymer resin may be in the form of particles. By using each of the first polymer resin and the second polymer resin in the form of particles as described above, pores can be formed in the coating layer.

According to an embodiment of the present disclosure, each of the first polymer resin and the second polymer resin may be soluble. The "soluble polymer" means a polymer that is dissolved by a solvent, and does not exhibit a particle form.

According to an embodiment of the present disclosure, the first coating layer may not include inorganic particles.

According to an embodiment of the present disclosure, the second coating layer may include a plurality of pores. Here, the pores refer to the pores in the coating layer and are generated at different locations from the pores in the porous polymer substrate. For example, the coating layer may be a porous coating layer. For example, the coating layer may be a porous coating layer including a plurality of pores therein. Since the coating layer includes a plurality of pores as described above, the coating layer allows lithium ions to pass therethrough and allow current to flow while physically blocking the negative electrode and positive electrode.

According to an embodiment of the present disclosure, the second coating layer may be formed by binding inorganic particles with the second polymer resin particles. The pores inside the second coating layer may result from interstitial volumes, which are empty spaces between the inorganic particles.

According to an embodiment of the present disclosure, the inorganic particles contained in the second coating layer are not particularly limited as long as the particles are electrochemically stable. That is, the inorganic particles that are usable in the present disclosure are not particularly limited as long as oxidation and/or reduction reactions do not occur in the operating voltage range of an applied electrochemical device (e.g., 0 to 5 V based on Li/Li$^+$). For example, when using inorganic particles with ion transport ability, performance improvement may be achieved by increasing ionic conductivity within the electrochemical device. In addition, when inorganic particles with a high dielectric constant (hereinafter, referred to as "high-k inorganic particles") are used as the inorganic particles, the inorganic particles contribute to increasing the degree of dissociation of an electrolyte salt, such as a lithium salt, in a liquid electrolyte so that the ionic conductivity of the electrolyte can be improved. The inorganic particles may include high-k inorganic particles with a dielectric constant of about 5 or more or about 10 or more, inorganic particles with lithium ion transport ability, or a mixture thereof. For example, the inorganic particles may be one selected from the group consisting of $BaSO_4$, $BaTiO_3$, $Pb(Zr, Ti)O_3$ (PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$(PMN—PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, aluminum peroxide, zinc tin hydroxide ($ZnSn(OH)_6$), tin-zinc oxide ($Zn_2SnO_4$, $ZnSnO_3$), antimony trioxide ($Sb_2O_3$), antimony tetroxide ($Sb_2O_4$), antimony pentoxide ($Sb_2O_5$), boehmite (AlO(OH)), and a combination thereof. However, these are only examples, and the present disclosure is not limited thereto.

According to an embodiment of the present disclosure, the sizes of the inorganic particles are not limited, but may be about 40 nm or more and about 3 μm or less for the formation of a coating layer with a uniform thickness and an appropriate porosity. For example, the sizes of the inorganic particles may be about 40 nm or more and 2.5 μm or less, 40 nm or more and 2 μm or less, 40 nm or more and 1.5 μm or less, or 40 nm or more and 1.0 μm or less. When the sizes of the inorganic particles satisfy the above ranges, the physical properties of the separator may be easily adjusted since the dispersibility is maintained, mechanical properties may be improved since an increase in the thickness of the coating layer is avoided, and there is a low probability of an internal electric shortage occurring during battery charging/discharging due to excessively large pore sizes.

According to an embodiment of the present disclosure, the coating layer may be formed on one side of the porous polymer substrate with a thickness of about 1 µm or more and 10 µm or less, and the thickness of the coating layer may be about 1 µm or more and 9 µm or less, 2 µm or more and 8 µm or less, 3 µm or more and 7 µm or less, 3 µm or more and 6 µm or less, or 3 µm or more and 5 µm or less. According to an embodiment, the coating layer may be coated on both sides of porous polymer substrate with a thickness of 4 µm on one side.

According to an embodiment of the present disclosure, the thickness of the polymer substrate and/or the coating layer may be measured by applying a contact-type thickness gauge. As the contact-type thickness gauge, for example, VL-50S-B from Mitutoyo Corporation may be used.

According to an embodiment of the present disclosure, the solubility of the first polymer resin in the electrolyte is higher than the solubility of the second polymer resin in the electrolyte.

For example, the first polymer resin refers to a polymer resin that is dissolved by an electrolyte that is injected into a battery case equipped with an electrode assembly such that the electrode assembly is immersed in the electrolyte, and finally eluted by the electrolyte in the lithium secondary battery product. The polymer solution coated on the porous polymer substrate is prepared by dissolving the first polymer resin soluble in the electrolyte in a solvent. Any liquid may be used as the solvent as long as the liquid is capable of dissolving the first polymer resin, but when a solvent that has affinity for the polymer components of the porous polymer substrate, the solvent easily penetrates into the pores in the porous polymer substrate.

In addition, the second polymer resin refers to a polymer resin that is insoluble or soluble in a very small amount by an electrolyte that is injected into the inside of a battery case equipped with an electrode assembly so that the electrode assembly is immersed in the electrolyte and is not finally eluted in a large amount by the electrolyte in the lithium secondary battery product. That is, since the second polymer needs not to be eluted into the electrolyte, the second polymer resin may be interpreted to include a polymer resin that swells with the electrolyte but is insoluble in the electrolyte.

As described above, when the solubility of the first polymer resin in the electrolyte is adjusted to be higher than the solubility of the second polymer resin in the electrolyte, it is possible to improve compression resistance and heat resistance even when a negative electrode containing a silicon (Si)-based active material is applied by preventing the pores inside the porous polymer substrate from being deformed.

According to an embodiment of the present disclosure, the solubility parameter of the first polymer resin may be about 17 MPa$^{1/2}$ or more and 27 MPa$^{1/2}$ or less. For example, the solubility parameter of the first polymer resin may be about 18 MPa$^{1/2}$ or more and 26 MPa$^{1/2}$ or less, 19 MPa$^{1/2}$ or more and 25 MPa$^{1/2}$ or less, 20 MPa$^{1/2}$ or more and 24 MPa$^{1/2}$ or less, or 21 MPa$^{1/2}$ or more and 23 MPa$^{1/2}$ or less. As the solubility parameter of the first polymer resin is adjusted to increase the electrolyte solubility, the compression resistance of a separator for an electrochemical device is improved.

According to an embodiment of the present disclosure, the solubility parameter of the second polymer resin may be less than 17 MPa$^{1/2}$ or greater than 27 MPa$^{1/2}$. When the solubility parameter of the second polymer resin is adjusted so that the difference in solubility parameter between the second polymer resin and the electrolyte is relatively large, the particle shape can be maintained even under the electrolyte, elution into the electrolyte is prevented so that the heat resistance and mechanical property of the separator can be improved due to the second polymer resin and inorganic particles, and the separator shrinks at a relatively high temperature so that the electric shortage of the electrodes can be prevented, and pores can be formed inside the coating layer.

According to an embodiment of the present disclosure, the difference between the solubility parameter of the first polymer resin and the solubility parameter of the second polymer resin may be about 3 or more and 100 or less. The difference may be about 5 or more and 100 or less, or 7 or more and 100 or less.

According to an embodiment of the present disclosure, the electrolyte solubility parameter may be expressed with the Hansen solubility parameter (HSP). That is, each material has an intrinsic solubility parameter value, and materials with similar solubility parameter values dissolve or mix well each other.

The Hansen solubility parameter was proposed by Dr. C. Hansen, and in the Hansen solubility parameter, the bonding degree of materials is considered in terms of the following three solubility parameters.

(1) Solubility parameter (δD) generated from nonpolar dispersion bonds
(2) Solubility parameter (δP) generated by polar bonds due to permanent dipoles
(3) Solubility parameter (δH) generated by hydrogen bonds As such, the HSP may be used to accurately and systematically evaluate the solubility or miscibility of a material.

$$HSP = (\delta D, \delta P, \delta H), (\text{J/cm}^3)^{1/2} \qquad (1)$$

$$\delta Tot = (\delta D^2 + \delta P^2 + \delta H^2)^{1/2}, (\text{J/cm}^3)^{1/2} \qquad (2)$$

HSP is a vector having a magnitude and direction in a space defined by three parameters, and δTot represents the magnitude of the HSP vector. The basic unit representing the HSP is (J/cm$^3$)$^{1/2}$. Such HSP values may be calculated using a program called HSPiP (Hansen Solubility Parameters in Practice) developed by a research group led by Dr. Hansen who proposed HSP. As mentioned above, when two materials have similar HSV values, the materials dissolve well each other, in which since the HSP is a vector, in order to determine that materials are similar, the materials should be similar in terms of all the three HSP elements and the HSP magnitude. All materials have HSPs, respectively, and through comparative analysis of similarity differences using the HSPs, it is possible to predict whether the materials of interest will dissolve each other or not.

According to an embodiment of the present disclosure, the first polymer resin may include one selected from the group consisting of polystyrene, polyethyl acrylate, polymethyl acrylate, polystyrene sulfide, polyethylene terephthalate, polyvinyl chloride (PVC), polyvinyl pyrrolidone (PVP), polyvinyl acetate (PVAc), polyacrylonitrile (PAN), polylactic acid (PLA), polyacrylic acid (PAA), and a combination thereof. For example, the first polymer resin may be polyacrylic acid (PAA). As described above, when the first polymer resin is selected from the group listed above to form the first coating layer that is eluted into the electrolyte, it is possible to improve compression resistance by preventing the pore inside the porous polymer substrate from being deformed even when a negative electrode containing a silicon (Si)-based active material is applied.

According to an embodiment of the present disclosure, the second polymer resin may include one selected from the group consisting of polyvinylidene fluoride-hexafluoroethylne (PVDF-HFP copolymer), polyvinylidene fluoride-chlorotrifluoroethylene copolymer (PVDF-CTFE copolymer), polyvinylidene fluoride-hexafluoropropylene-chlorotrifluoroethylene terpolymer (PVDF-HFPCTFE terpolymer), cyanoethyl polyvinyl alcohol, and a combination thereof. For example, the second polymer resin may be PVDF-HFP copolymer and/or PVDF-CTFE copolymer. As described above, when the second polymer resin is selected from the group listed above and the second coating layer containing the second polymer resin that is not eluted into the electrolyte is formed, it is possible to improve both compression resistance and heat resistance by preventing pores inside the porous polymer substrate from being deformed even when a negative electrode containing a silicon (Si)-based active material is applied.

According to an embodiment of the present disclosure, a generally used acryl-based polymer has a relatively high affinity for an electrolyte and substantially swells under the electrolyte even when crosslinked, and thus, when the acryl-based polymer is used alone, the polymer may swell (expand) and dissolve under the electrolyte. In contrast, a PVDF-based polymer, which has a large difference in solubility parameter from that of the electrolyte, is advantageous in maintaining the particle shape even under the electrolyte and does not dissolve even when swollen under the electrolyte, thereby improving compression resistance and heat resistance according to the present disclosure.

According to an embodiment of the present disclosure, the separator may have multiple pores, the polydispersity index (PDI) of the porous polymer substrate may be about 2.5 or more and 10 or less, and the average pore size of the porous polymer substrate may be 20 nm or more and 80 nm or less. The polydispersity index of the porous polymer substrate is low, and the average pore size of the porous polymer substrate is small. Compression resistance may be improved when these ranges are simultaneously satisfied. For example, the polydispersity index (PDI) of the porous polymer substrate may be about 3.0 or more and about 9.5 or less, 3.5 or more and 9.0 or less, 4.0 or more and 8.5 or less, 4.5 or more and 8.0 or less, 5.0 or more and 7.5 or less, 5.5 or more and 7.0 or less, or 6.0 or more and 6.5 or less. When the polydispersity index is less than 2.5, there is a problem in that processability is lowered and the uniformity of the film is lowered, and when the polydispersity exceeds 10, there is a problem in that compression resistance is lowered.

In addition, for example, the average pore size of the porous polymer substrate may be about 25 nm or more and about 75 nm or less, 30 nm or more and 70 nm or less, 35 nm or more and 65 nm or less, 40 nm or more and 60 nm or less, or 45 nm or more and 55 nm or less. When the average pore size is less than 20 nm, there is a problem in that air permeability decreases and by-products shut down the small pores during charging and discharging of the battery, and when the average pore size exceeds about 80 nm, there is a problem in that the thickness of the separator is not uniform, thickness deformation is caused, and compression resistance is reduced due to local thickness deformation.

According to an embodiment of the present disclosure, the average pore size of the porous polymer substrate may be calculated from a pore size distribution measured using a capillary flow porometer. For example, first, the separator to be measured is wetted with a wetting agent such as galwick solution, and then the air pressure on one surface of the substrate is gradually increased. At this time, when the applied air pressure becomes greater than the capillary attraction of the wetting agent present in the pores, the wetting agent shutting down the pores are pushed out, and the pore size and distribution are measured based on the pressure and flow rate at the moment of being pushed out, and from this, the average pore size can be confirmed.

According to an embodiment of the present disclosure, the content of the silicon (Si)-based active material in the negative electrode may be about 50% by weight or more. For example, the content may be 50% by weight or more and less than 100% by weight, 55% by weight or more and less than 95% by weight or less, 60% by weight or more and 90% by weight or less, 65% by weight or more and 85% by weight or less, 60% by weight or more and 80% by weight or less, or 65% by weight or more and 75% by weight or less. As described above, by adjusting the content of the silicon (Si)-based active material in the negative electrode, it is possible to improve the energy density of the battery compared to when the graphite-based negative electrode active material is applied alone.

According to an embodiment of the present disclosure, the negative electrode may have a hardness of about 50 MPa or more and about 350 MPa or less. For example, the hardness may be about 75 MPa or more and 325 MPa or less, 100 MPa or more and 300 MPa or less, 125 MPa or more and 275 MPa or less, 150 MPa or more and 250 MPa or less, or 175 MPa or more and 225 MPa or less. When the hardness is outside the above-mentioned ranges, the pores of the separator are more likely to be deformed than when a graphite-based negative electrode active material is applied, and the energy density of the battery may decrease.

According to an embodiment of the present disclosure, the hardness may be indentation hardness (HIT) measured by a nanoindenter.

The indentation is one of analysis methods for the mechanical properties of materials, and is an experimental method in which diamond indenters with various shapes are intended into a material and then comparing and analyzing the indentation marks and the loads at the time of indentation. This indentation test is a technique for measuring fracture toughness or hardness of a material. Furthermore, recently, research has been actively conducted in various other directions on the indentation test, and the indentation test is also used as a research technique for, for example, analysis of elastoplastic behavior and a residual stress states of a material, an adhesion experiment for a thin film, and analysis of a fracture characteristic and phase transformation. In particular, when conducting indentation on a fine material such as an electrode as in the present disclosure, nano-indentation in which a load in a unit of N or less is applied using indenters is applicable.

The hardness is obtained from an applied load-indentation depth curve obtained by continuously measuring the applied loads from the indenters and the indentation depths during loading and unloading when the indenters are indented into the surface of the electrode active material layer. For example, the hardness is calculated by the equation of (Pmax)/A from the maximum load (Pmax) and the contact projection area A of an indenter when the indenter is indented by applying the maximum load (Pmax).

The hardness is an indicator that is capable of indicating the physical properties of an electrode active material layer. A high hardness means that the degree of deformation of the electrode active material layer due to external force is small. In other words, a higher hardness means that the particles constituting the electrode active material are bound each other more strongly, resulting in greater resistance to indentation. In contrast, a lower hardness means that the particles constituting the electrode active material layer are bound each other weaklier, resulting in smaller resistance to indentation.

According to an embodiment of the present disclosure, since the Si-based negative electrode active material has a higher hardness than the graphite negative electrode active material, there is a high possibility that the pores of the separator will be deformed during the electrode assembly process.

In a separator manufacturing process according to an embodiment of the present disclosure, a porous polymer substrate 110 may be provided, a first coating layer 131 may be formed on at least one surface of the prepared polymer substrate 110, and a second coating layer 133 may be formed on the first coating layer 131. According to an embodiment of the present disclosure, a method of forming the coating layer is, for example, as follows. First, a polymer solution is prepared by dissolving a binder resin in an appropriate organic solvent. For example, the solvent has a solubility parameter similar to that of a binder polymer to be used and has a boiling point lower than that of the binder polymer. This is to facilitate uniform mixing and subsequent solvent removal. Non-limiting examples of usable solvents include acetone, tetrahydrofuran, methylene chloride, chloroform, dimethylformamide, N-methyl-2-pyrrolidone (NMP), cyclohexane, water, or a mixture thereof. Next, inorganic particles are added and dispersed in the prepared polymer solution to prepare a porous polymer substrate 110. In the present disclosure, the content ratio of the inorganic particles and the binder is appropriately adjusted in consideration of the thickness, pore size, and porosity of the finally manufactured coating layer of the present disclosure. Next, the first polymer material and the second polymer material are selected to prepare slurries for the first coating layer and the second coating layer, respectively. Thereafter, the solubility of the selected first polymer material in the electrolyte and the solubility of the selected second polymer material in the electrolyte are compared.

As a result of the comparison, when it is determined that the solubility of the first polymer material in the electrolyte is higher than the solubility of the second polymer material in the electrolyte, the selected first polymer material is applied to prepare the slurry for the first coating layer. Thereafter, the slurry for the first coating layer containing the first polymer material is applied to at least one surface of the prepared porous polymer substrate 110 and dried to form the first coating layer 131 on the porous polymer substrate 110. When it is determined that the solubility of the first polymer material in the electrolyte is lower than the solubility of the second polymer material in the electrolyte, the process is returned to a previous step and selection for the first polymer material and the second polymer material is repeated. Next, the selected second polymer material is applied to prepare the slurry for the second coating layer, and the prepared slurry for the second coating is applied onto the first coating layer and dried to form the second coating layer.

The first coating layer and the second coating layer may be prepared to be separated from each other in the same manner as described above. However, the first coating layer and the second coating layer may not be separated from each other and, for example, may be coated simultaneously to form a coating layer. In addition, the sequence of the above-described preparing processes may be appropriately modified without being limited to the described sequence. For example, the processes of selecting the first polymer material and the second polymer material and comparing their solubility in the electrolyte may be conducted even before preparing the porous polymer solution, and the preparing of the slurries for the first and second coating layers to which the first and second polymer materials are applied may also be conducted before preparing the porous polymer solution. In addition, the slurry for the first coating layer and the slurry for the second coating layer may be independently prepared at the same time or at different times without being restricted by the process sequence.

According to an embodiment of the present disclosure, the method of applying the slurries to the surface of the separator substrate is not particularly limited to any one method as disclosed hereon. For example, various methods such as dip coating, die coating, roll coating, comma coating, or a combination thereof may be used.

According to an embodiment of the present disclosure, the drying process appropriately sets temperature and time conditions to minimize the occurrence of surface defects in the organic/inorganic composite coating layer. For the drying, a drying auxiliary device such as a drying oven or a hot air blower may be used within an appropriate range.

According to an embodiment of the present disclosure, the prepared separator is sandwiched between a positive electrode and a negative electrode containing a Si-based negative electrode active material and is manufactured into an electrode assembly through a lamination process in which heat and/or pressure are applied to bind the separator and the negative and positive electrodes. The lamination process may be conducted by a roll press device including a pair of pressing rollers. That is, interlayer binding may be achieved by sequentially stacking and putting the negative electrode, the separator, and the positive electrode into the space between the pressure rollers. At this time, the lamination process may be conducted by hot pressing.

An embodiment of the present disclosure includes an electrochemical device including a positive electrode, a negative electrode, and an electrolyte, and including a separator interposed between the positive electrode and the negative electrode.

In an electrochemical device according to an embodiment of the present disclosure, the second coating layer containing the second polymer resin and inorganic particles are provided on the first coating layer containing the first polymer resin. Therefore, even when a negative electrode containing a silicon (Si)-based active material is applied, the pores inside the porous polymer substrate is prevented from being deformed, so that compression resistance and heat resistance are both improved.

According to an embodiment of the present disclosure, the negative electrode includes a negative electrode current collector and a negative electrode active material layer on at least one surface of the current collector. The negative electrode active material layer includes a negative electrode material containing a Si-based negative electrode active material and a binder resin, and optionally includes a conductive material as needed. As the negative electrode active material, a silicon (Si)-based negative electrode active material may be used alone, or optionally in combination with a carbon-based negative electrode active material such as graphite. The silicon (Si)-based negative electrode active material may be the same as described above.

According to an embodiment of the present disclosure, the content of the silicon (Si)-based active material may be about 50% by weight or more. For example, the content may be 50% by weight or more and less than 100% by weight, 55% by weight or more and less than 95% by weight or less, 60% by weight or more and 90% by weight or less, 65% by weight or more and 85% by weight or less, 60% by weight or more and 80% by weight or less, or 65% by weight or more and 75% by weight or less. As described above, by adjusting the content of the silicon (Si)-based active material in the negative electrode, the energy density of the battery may be improved compared to when the graphite-based negative electrode active material is applied alone.

According to an embodiment of the present disclosure, the positive electrode includes a positive electrode current collector and includes, on at least one surface of the current collector, a positive electrode active material layer which includes a positive electrode active material, a conductive material, and a binder resin. The positive electrode active material may contain one or a mixture of two or more of: layered compounds such as lithium manganese complex oxide (e.g., $LiMn_2O_4$ or $LiMnO_2$), lithium cobalt oxide ($LiCoO_2$), and lithium nickel oxide ($LiNiO_2$); lithium manganese oxides such as those expressed by the formula $Li1+xMn_{2-x}O_4$ (where x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni site type lithium nickel oxide expressed by the formula $LiNi_{1-x}M_xO_2$ (where M=Co, Mn, Al, Cu, Fe, Mg, B or Ga, and x=0.01 to 0.3); lithium manganese complex oxides expressed by the chemical formula $LiMn_{1-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which part of Li in the chemical formula is replaced with an alkaline earth metal ion; disulfide compounds; and $Fe_2(MoO_4)_3$, or a mixture of two or more of these materials. For example, the positive electrode active material may be $LiNi_{0.8}Mn_{0.1}Co_{0.1}O_2$.

According to an embodiment of the present disclosure, the conductive material may be, for example, one selected from the group consisting of graphite, carbon black, carbon fiber or metal fiber, metal powder, conductive whisker, conductive metal oxide, activated carbon, and a polyphenylene derivative, or a mixture of two or more of these conductive materials. Furthermore, the conductive material may be, for example, one selected from the group consisting of natural graphite, artificial graphite, super-p, acetylene black, Ketjen black, channel black, furnace black, lamp black, thermal black, denka black, aluminum powder, nickel powder, zinc oxide, potassium titanate, and titanium oxide, or a mixture of two or more of these conductive materials.

According to an embodiment of the present disclosure, as the binder resin, a polymer resin commonly used in electrodes in the art may be used. Non-limiting examples of such binder resins include, but are not limited to, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose (CMC), polyvinyl alcohol (PVA), polyacrylic acid (PAA), polyethylene glycol (PEG), polyacrylonitrile (PAN), and polyacryl amide (PAM).

A battery may be manufactured by placing the electrode assembly prepared as described above in an appropriate case and injecting an electrolyte into the case.

According to an embodiment of the present disclosure, the solubility parameter of the electrolyte may be about 17 $MPa^{1/2}$ or more and 27 $MPa^{1/2}$ or less. For example, the solubility parameter of the electrolyte may be about 18 $MPa^{1/2}$ or more and 26 $Mpa^{1/2}$ or less, 19 $Mpa^{1/2}$ or more and 25 $Mpa^{1/2}$ or less, 20 $Mpa^{1/2}$ or more and 24 $Mpa^{1/2}$ or less, or 21 $Mpa^{1/2}$ or more and 23 $Mpa^{1/2}$ or less. In the case where the above-mentioned ranges of the electrolyte solubility parameter are satisfied, even when a first polymer resin having a solubility parameter similar to the above-mentioned solubility parameters is immersed in the electrolyte and then elution is caused and a negative electrode containing a silicon (Si)-based active material is applied, it is possible to improve both compression resistance and heat resistance by preventing deformation of the pores in the porous polymer substrate. That is, a smaller difference between the solubility parameter of the electrolyte and the solubility parameter of the first polymer resin may make solubility excellent. Therefore, the solubility parameter of the electrolyte may be similar or identical to the solubility parameter of the first polymer resin.

According to an embodiment of the present disclosure, the electrolyte may be obtained by dissolving or dissociating a salt with a structure of $A^+B^-$, in which $A^+$ includes an alkali metal cation such as $Li^+$, $Na^+$, $K^+$ or a combination thereof, and $B^-$ includes an anion such as $PF6^-$, $BF4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof, in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), γ-butyrolactone, or a mixture thereof. For example, according to an embodiment, the electrolyte may include one selected from the group consisting of propylene carbonate (PC), dimethyl carbonate (DMC), diethyl carbonate (DEC), fluoro-ethylene carbonate (FEC), and a combination thereof.

According to an embodiment of the present disclosure, a mixture of the diethyl carbonate (DEC) and the fluoro-ethylene carbonate (FEC) may be used as the electrolyte.

According to an embodiment of the present disclosure, the electrolyte may has a content ratio of propylene carbonate (PC) and dimethyl carbonate (DMC) of about 10:90 to 99:1. For example, the content ratio may be about 20:80 to 98:2, 30:70 to 97:3, 40:60 to 96:4, 50:50 to 95:5, 60:40 to 94:6, 70:30 to 93:7, 80:20 to 92:8, or about 90:10.

An embodiment of the present disclosure provides a battery module including a battery including the electrode assembly as a unit cell, a battery pack including the battery module, and a device including the battery pack as a power source. Specific examples of the device include, but are not limited to, a power tool that is powered by a battery powered motor, an electric car such as an electric vehicle (EV), a hybrid electric vehicle (HEV), or a plug-in hybrid electric vehicle (PHEV), an electric motorcycle such as an electric bike (E-bike) or an electric scooter (E-scooter), an electric golf cart, and a power storage system.

Hereinafter, the present disclosure will be described in detail with reference to examples. However, the embodiments according to the present disclosure may be modified into various other forms, and the scope of the present disclosure should not be construed as being limited to the embodiments to be described below. The embodiments described herein are provided to more completely explain the present disclosure to a person ordinarily skilled in the art.

EXAMPLE

SV9 separator fabric (thickness: 9 μm, porosity: 46%, basis weight: 4.9 g/m$^2$, Gurley value: 70 sec/100 cc) manufactured by Shanghai Energy Corp. was used as the porous polymer substrate.

Meanwhile, polyacrylic acid (PAA) (CK-702 manufactured by Dow Chemical) was used as the first polymer resin soluble in electrolyte, and the first polymer resin was completely dissolved in the solvent water at a concentration of 10% by weight to prepare a polymer solution. The solubility parameter of the first polymer resin over the electrolyte was 22.4 MPa$^{1/2}$.

The prepared polymer solution was dip coated on the porous polyethylene polymer substrate fabric and dried at 65° C. to form a polymer coating layer.

Next, as the second polymer resins, PVDF-HFP (solef 21510 (HFP 15 wt %) manufactured by Solvay) and PVDF-CTFE (solef 32008 manufactured Solvay) were dissolved in the solvent acetone. Then, as a dispersant, cyano resin (CYR-301 manufactured by Miwon Corp.) was dissolved in the solvent acetone to prepare a slurry. The solubility parameters of the second polymer resins, 21510 and 32008, were 13.5 MPa$^{1/2}$ and 15.1 MPa$^{1/2}$, respectively.

Al$_2$O$_3$ with an average particle diameter of about 500 nm and Boehmite particles with an average particle diameter of 300 nm were prepared as inorganic particles. Al$_2$O$_3$, Boehmite, 21510, 32008, and CYR-301 were added to the solvent acetone in an amount of 15% by weight, and uniformly mixed to prepare a final slurry with Al$_2$O$_3$:Boehmite:21510: 32008:CYR-301=66.3:11.7:15.5:4.5:2.5 in a weight ratio.

The prepared slurry was coated on both side surfaces of the above-described polymer coating layer with a thickness of 8 μm and dried at 45° C. to form an outer coating layer.
Manufacturing of Positive Electrode A positive electrode active material (LiNi$_{0.8}$Mn$_{0.1}$Co$_{0.1}$O$_2$), a conductive material (carbon black), a dispersant, and a binder resin (a mixture of PVDF-HFP and PVDF) were mixed with water in a weight ratio of 97.5: 0.7:0.14:1.66 to prepare a slurry for a positive electrode active material layer with a concentration of 50 wt % of the remaining components excluding water. Next, the slurry was applied to the surface of a thin aluminum film (10 μm thick) and dried to manufacture a positive electrode with a positive electrode active material layer (120 μm thick).
Manufacturing of Negative Electrode Silicon particles (M702 manufactured by Elkem Corp.), a PAM-based binder (BUH0452 manufactured by Arakawa Corp.), a conductive material (SFG-6L manufactured by Imerys Corp.), a conductive material (SWCNT) (Tuball dispersion manufactured by Ocsial Corp.), and CMC dispersant (SWCNT, Ocsial, Tuball dispersion) were mixed with water in a weight ratio of 80:9.4:9.6:0.4:0.6 to prepare a slurry for a negative electrode active material layer with a concentration of 25 wt % of the remaining components excluding water. Next, the slurry was applied to the surface of a thin copper film (8 μm thick) and dried to manufacture a negative electrode with a negative electrode loading of 8 mAh/cm$^2$. The hardness of the negative electrode was measured to be 80 MPa.

Lamination Process

The negative and positive electrodes prepared as described above and the separators of Example and Comparative Examples were stacked such that each separator is interposed between a negative electrode and a positive electrode, and conducting a lamination process to obtain electrode assemblies. The lamination process was performed using a hot press at 70° C. and 5.2 MPa for 10 seconds.
Electrolyte Injection Process The electrode assembly obtained in the lamination process was inserted into a pouch exterior material, and an electrolyte containing 0.5M LiPF$_6$ and 1.0M LiFSI dissolved in a mixed solvent with a composition of DEC/FEC=90/10 (vol. %) was injected into the pouch exterior material to manufacture a lithium secondary battery.

Comparative Example 1

A lithium secondary battery was manufactured in the same manner as in Example, except that the separator fabric was not coated with the solution of the first polymer resin.

Comparative Example 2

The separator fabric was not coated with the solution of the first polymer resin. In addition, as the second polymer resin, PVDF (KF9700 manufactured by KF9700) with a solubility of 17 MPa$^{1/2}$ or more in the electrolyte was dissolved in acetone to prepare a slurry. The solubility parameter of the PVDF, which is the second polymer resin, was 19.2 MPa$^{1/2}$. Then, as a dispersant, cyano resin (CYR-301 manufactured by Miwon Corp.) was dissolved in the solvent acetone to prepare a slurry.

Al$_2$O$_3$ with an average particle diameter of about 500 nm and Boehmite particles with an average particle diameter of 300 nm were prepared as inorganic particles. Al$_2$O$_3$, Boehmite, PVDF, and CYR-301 were added to the solvent acetone in an amount of 15% by weight, and uniformly mixed to prepare a final slurry with Al$_2$O$_3$:Boehmite:PVDF: CYR-301=66.3:11.7:20:2.0 in a weight ratio.

The prepared slurry was coated on both side surfaces of the above-described polymer coating layer with a thickness of 8 μm and dried at 45° C. to form an outer coating.

Comparative Example 3

SV9 separator fabric (thickness: 9 μm, porosity: 46%, basis weight: 4.9 g/m$^2$, Gurley value: 70 sec/100 cc) manufactured by Shanghai Energy Corp. was used as the porous polymer substrate.

Meanwhile, polyacrylic acid (PAA) (CK-702 manufactured by Dow Chemical) was used as the first polymer resin soluble in electrolyte, and the first polymer resin was completely dissolved in the solvent water at a concentration of 10% by weight to prepare a polymer solution. The solubility parameter of the first polymer resin over the electrolyte was 22.4 MPa$^{1/2}$.

In addition, as the second polymer resin, PVDF (KF9700 manufactured by Solvay Corp.) with a solubility of 17 MPa$^{1/2}$ or more in the electrolyte was dissolved in acetone to prepare a slurry. The solubility parameter of the PVDF, which is the second polymer resin, was 19.2 MPa$^{1/2}$ Then, as a dispersant, cyano resin (CYR-301 manufactured by Miwon Corp.) was dissolved in the solvent acetone to prepare a slurry.

Al$_2$O$_3$ with an average particle diameter of about 500 nm and Boehmite particles with an average particle diameter of 300 nm were prepared as inorganic particles. $Al_2O_3$, Boehmite, PVDF, and CYR-301 were added to the solvent acetone in an amount of 15% by weight, and uniformly mixed to prepare a final slurry with $Al_2O_3$:Boehmite:PVDF:CYR-301=66.3:11.7:20:2.0 in a weight ratio.

The prepared slurry was coated on both side surfaces of the above-described polymer coating layer with a thickness of 8 μm, and dried at 45° C. to form an outer coating layer.

Comparative Example 4

Polyacrylic acid (PAM) (MP15 manufactured by Song Kang Ind Co., Ltd.) was used as the first polymer resin insoluble in the electrolyte, and the first polymer resin was completely dissolved in the solvent water at a concentration of 10% by weight to form a polymer solution. The solubility parameter of the first polymer resin over the electrolyte was 13.5 $MPa^{1/2}$. Then, the first polymer resin was coated on the same porous polymer substrate as in Example.

Next, as the second polymer resins, PVDF-HFP (solef 21510 (HFP 15 wt %) manufactured by Solvay) and PVDF-CTFE (solef 32008 manufactured Solvay) were dissolved in the solvent acetone. Then, as a dispersant, cyano resin (CYR-301 manufactured by Miwon Corp.) was dissolved in the solvent acetone to prepare a slurry. The solubility parameters of the second polymer resins, 21510 and 32008, were 13.5 $MPa^{1/2}$ and 15.1 $MPa^{1/2}$, respectively.

$Al_2O_3$ with an average particle diameter of about 500 nm and Boehmite particles with an average particle diameter of 300 nm were prepared as inorganic particles. $Al_2O_3$, Boehmite, 21510, 32008, and CYR-301 were added to the solvent acetone in an amount of 15% by weight, and uniformly mixed to prepare a final slurry with $Al_2O_3$:Boehmite:21510:32008:CYR-301=66.3:11.7:15.5:4.5:2.5 in a weight ratio.

The prepared slurry was coated on either surface of the above-described polymer coating layer with a thickness of 8 μm and dried at 45° C. to form an outer coating layer.

Comparative Example 5

Polyacrylic acid (PAM) (MP15 manufactured by Song Kang Ind Co., Ltd.) was used as the first polymer resin insoluble in the electrolyte, and the first polymer resin was completely dissolved in the solvent water at a concentration of 10% by weight to form a polymer solution. The solubility parameter of the first polymer resin over the electrolyte was 13.5 $MPa^{1/2}$. Then, the first polymer resin was coated on the same porous polymer substrate as in Example.

In addition, as the second polymer resin, PVDF (KF9700 manufactured by Solvay Corp.) with a solubility of 17 $MPa^{1/2}$ or more in the electrolyte was dissolved in acetone to prepare a slurry. The solubility parameter of the PVDF, which is the second polymer resin, was 19.2 $MPa^{1/2}$. Then, as a dispersant, cyano resin (CYR-301 manufactured by Miwon Corp.) was dissolved in the solvent acetone to prepare a slurry.

$Al_2O_3$ with an average particle diameter of about 500 nm and Boehmite particles with an average particle diameter of 300 nm were prepared as inorganic particles. $Al_2O_3$, Boehmite, PVDF, and CYR-301 were added to the solvent acetone in an amount of 15% by weight, and uniformly mixed to prepare a final slurry with $Al_2O_3$:Boehmite:PVDF:CYR-301=66.3:11.7:20:2.0 in a weight ratio.

The prepared slurry was coated on either surface of the above-described polymer coating layer with a thickness of 8 μm and dried at 45° C. to form an outer coating layer.

Experimental Example

[PDI Measurement]

PDI=(weight-average molecular weight)/(number-average molecular weight)

At this time, as the weight-average molecular weight and number-average molecular weight values, values derived through gel permeation chromatography (GCP) analysis by cutting the separators into a predetermined size were used.

[Measurement of Average Pore Size]

Pore sizes were measured using a capillary flow porometer (CFP method) to obtain a pore size distribution.

[Thickness Reduction Ratio After Hot-Press]

The thicknesses of the separators of Example and Comparative Examples manufactured as described above were changed by pressing using a hot press, and then the thicknesses were measured. The thickness reduction rates were calculated using the equation below. The pressing was conducted under the conditions of 70° C., 5.2 MPa, and 10 sec. Thicknesses were measured using a thickness gauge (VL-50S manufactured by Mitutoyo).

Thickness reduction ratio =

$\{$(thickness of separator before hot pressing $-$ thickness of separator after hot pressing)/thickness of separator before hot pressing$\} * 100$

[Wet Heat Shrinkage Measurement Experiment]

A separator was cut into a piece of 5 cm×5 cm, 1 g of a PC solution was injected into a pouch with the piece, and then the pouch was sealed to prepare a sample. After the sample was left at a temperature of 135° C. for 30 minutes, the shrinkage rate of the separator was measured.

The shrinkage rate was obtained as a result of marking two arbitrary points in each of MD and TD directions of the sample and calculating the increase/decrease rate of the gauge distances (the distances between the marked points) according to Equation 1 below.

$$\text{Shrinkage rate (\%)} = \{(B - A)/A\} \quad \text{(Equation 1)}$$

In Equation 1, A is the gauge distance in the initial state before being left at high temperature, and B is the gauge distance in the final state after being left at high temperature.

[Capacity Retention Rate Measurement After 500 Cycles at 25° C. and 1 C/1 C]

For a battery manufactured by the above-described method, charging and discharging were repeated in the range of 2.5V to 4.25V at a rate of 1 C for each of the charging and discharging at 25° C., and the ratio of discharging capacity after 500 cycles was derived by calculation.

TABLE 1

|  | Example | Comparative Example 1 | Comparative Example 2 | Comparative Example 3 | Comparative Example 4 | Comparative Example 5 |
|---|---|---|---|---|---|---|
| Solubility parameter of first polymer resin ($MPa^{1/2}$) | 22.4 | — | — | 22.4 | 13.5 | 13.5 |
| Solubility parameter of second polymer resin ($MPa^{2/1}$) | 13.5, 15.1 | 13.5, 15.1 | 19.2 | 19.2 | 13.5, 15.1 | 19.2 |
| Total thickness before pressing (μm) | 17.0 | 16.9 | 17.1 | 16.8 | 16.9 | 17.0 |
| Thickness after pressing (μm) | 14.2 | 13.5 | 13.8 | 13.9 | 13.6 | 14.0 |
| Thickness reduction ratio after hot pressing (%) | 16 | 20 | 19 | 17 | 20 | 18 |
| Wet heat shrinkage at 130° C. for 30 min (MD/TD) | 6/4 | 14/11 | 14/13 | 8/6 | 9/7 | 8/6 |
| Capacity retention rate (%) after 500 cycles at 25° C. and 1 C/1 C | 92 | 82 | 84 | 90 | 86 | 88 |

In the Table 1 above, it was confirmed that wet heat shrinkage was poor in Comparative Examples 1 and 2 compared to Example because the first polymer resin was not coated on the fabrics.

In the case of Comparative Example 2, it was confirmed that the cell capacity maintenance rate was slightly improved compared to Comparative Example 1 because the solubility parameter of the coating layer was relatively similar to that of the electrolyte.

The separator in Comparative Example 3 had a smaller difference in solubility between the first polymer resin and the second polymer resin than that in Example, and compared to Example, Comparative Example 3 exhibited the tendency to become poor in ionic conductivity of the electrolyte and long-term cell capacity maintenance rate due to the excessive dissolution in the electrolyte.

In the case of Comparative Example 4, the separator was coated with the first polymer resin and the second polymer resin which were both insoluble in the electrolyte, and as a result, it was confirmed that Comparative Example 4 became poor in the cell capacity retention rate compared to Example and Comparative Examples 3 and 5.

In the case of Comparative Example 5, the separator has a property in which the first polymer resin coated on the substrate is not soluble in the electrolyte, and the second polymer resin applied to the coating layer is relatively soluble in the electrolyte. However, it is confirmed that the cell capacity maintenance rate becomes poor compared to Example due to the fact that the dissolving property of the coating layer in the electrolyte is poor since the solubility parameter of the second polymer resin applied to the coating layer is lower than the solubility parameter of the first polymer resin coated on the fabric of Example.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

LIST OF REFERENCE NUMERALS

100 . . . separator
110 . . . porous polymer substrate
130 . . . coating layer
131 . . . first coating layer
133 . . . second coating layer
200 . . . negative electrode

What is claimed is:

1. A separator for an electrochemical device, the separator comprising:
a porous polymer substrate;
a first coating layer provided on at least one surface of the porous polymer substrate and essentially consisting of a first polymer resin of a first solubility in an electrolyte; and
a second coating layer provided on the first coating layer and including a second polymer resin of a second solubility in the electrolyte, and inorganic particles,
wherein the first solubility is higher than the second solubility in the electrolyte,
the separator is provided on a negative electrode containing a silicon (Si), and
wherein a difference between a solubility parameter of the first polymer resin and a solubility parameter of the second polymer resin is 7 $MPa^{1/2}$ or more and 100 $MPa^{1/2}$ or less.

2. The separator of claim 1, wherein the first polymer resin has a solubility parameter of 17 $MPa^{1/2}$ or more and 27 $MPa^{1/2}$ or less.

3. The separator of claim 1, wherein the second polymer resin has a solubility parameter less than 17 $MPa^{1/2}$ or greater than 27 $MPa^{1/2}$.

4. The separator of claim 1, wherein the first polymer resin includes one selected from the group consisting of polystyrene, polyethyl acrylate, polymethyl acrylate, polystyrene sulfide, polyethylene terephthalate, polyvinyl chloride (PVC), polyvinyl pyrrolidone (PVP), polyvinyl acetate (PVAc), polyacrylonitrile (PAN), polylactic acid (PLA), polyacrylic acid (PAA), and a combination thereof.

5. The separator of claim 1, wherein the second polymer resin includes one selected from the group consisting of PVDF-HFP copolymer, PVDF-CTFE copolymer, PVDF-HFP-CTFE terpolymer, cyanoethyl polyvinyl alcohol, and a combination thereof.

6. The separator of claim 1, wherein the separator has multiple pores,
the porous polymer substrate has a polydispersity index (PDI) of 2.5 or more and 10 or less, and
the porous polymer substrate has an average pore size of 20 nm or more and 80 nm or less.

7. The separator of claim 1, wherein the negative electrode contains the silicon (Si)-based active material 50% by weight or more.

8. The separator of claim 1, wherein the negative electrode has a hardness of 50 MPa or more and 350 MPa or less.

9. An electrochemical device comprising a positive electrode, a negative electrode, an electrolyte, and the separator of claim 1 interposed between the positive electrode and the negative electrode.

10. The electrochemical device of claim 9, wherein the electrolyte has a solubility parameter of 17 $MPa^{1/2}$ or more and 27 $MPa^{1/2}$ or less.

11. The electrochemical device of claim 9, wherein the electrolyte includes one selected from the group consisting of propylene carbonate (PC), dimethyl carbonate (DMC), diethyl carbonate (DEC), fluoro-ethylene carbonate (FEC), and a combination thereof.

12. The electrochemical device of claim 11, wherein the electrolyte is used by mixing the diethyl carbonate (DEC) and the fluoro-ethylene carbonate (FEC).

13. The electrochemical device of claim 12, wherein the electrolyte contains the diethyl carbonate (DEC) and the fluoroethylene carbonate (FEC) in a ratio of 10:90 to 99:1.

* * * * *